US010294161B2

(12) United States Patent
Deters et al.

(10) Patent No.: US 10,294,161 B2
(45) Date of Patent: *May 21, 2019

(54) MOLDING MATERIAL MIXTURES CONTAINING METAL OXIDES OF ALUMINUM AND ZIRCONIUM IN PARTICULATE FORM

(71) Applicant: ASK Chemicals GmbH, Hilden (DE)

(72) Inventors: Heinz Deters, Düsseldorf (DE); Henning Zupan, Wuppertal (DE); Martin Oberleiter, Düsseldorf (DE)

(73) Assignee: ASK Chemicals GmbH, Hilden (DE)

( * ) Notice: Subject to any disclaimer, the term of this patent is extended or adjusted under 35 U.S.C. 154(b) by 150 days.

This patent is subject to a terminal disclaimer.

(21) Appl. No.: 14/654,099

(22) PCT Filed: Dec. 20, 2013

(86) PCT No.: PCT/DE2013/000814

§ 371 (c)(1),
(2) Date: Jun. 19, 2015

(87) PCT Pub. No.: WO2014/094722

PCT Pub. Date: Jun. 26, 2014

(65) Prior Publication Data

US 2015/0315083 A1 Nov. 5, 2015

(30) Foreign Application Priority Data

Dec. 22, 2012 (DE) ........................ 10 2012 113 074

(51) Int. Cl.
*C04B 35/109* (2006.01)
*B22C 1/18* (2006.01)
(Continued)

(52) U.S. Cl.
CPC ............ *C04B 35/109* (2013.01); *B22C 1/162* (2013.01); *B22C 1/188* (2013.01); *B22C 9/02* (2013.01);
(Continued)

(58) Field of Classification Search
CPC ........... B22C 1/162; B22C 1/188; B22C 9/02; C04B 2235/3217; C04B 2235/3244; C04B 2235/36; C04B 35/109
See application file for complete search history.

(56) References Cited

U.S. PATENT DOCUMENTS 3,203,057 A 8/1965 Hunt
4,233,076 A 11/1980 Blanc
(Continued)

FOREIGN PATENT DOCUMENTS

DE 10 2007 045649 4/2009
EP 1043094 10/2000
(Continued)

*Primary Examiner* — Shuangyi Abu Ali
(74) *Attorney, Agent, or Firm* — Standley Law Group LLP

(57) ABSTRACT

The invention relates to mold material mixtures containing an oxide of aluminum and an oxide of zirconium as particulate mixed metal oxide, in combination with refractory mold base materials and a water glass-based binder system. The mold material mixtures, also in the form of multicomponent systems, are used for the production of molds and cores for the foundry industry.

25 Claims, 1 Drawing Sheet

(51) Int. Cl.
*B22C 1/16* (2006.01)
*B22C 9/02* (2006.01)

(52) U.S. Cl.
CPC ................. *C04B 2235/3217* (2013.01); *C04B 2235/3244* (2013.01); *C04B 2235/36* (2013.01)

(56) References Cited

U.S. PATENT DOCUMENTS

| | | | | |
|---|---|---|---|---|
| 4,432,798 | A | 2/1984 | Helferich | |
| 5,972,102 | A | 10/1999 | Vezza | |
| 6,008,152 | A * | 12/1999 | Guillo | C04B 35/14 222/566 |
| 6,598,654 | B2 | 7/2003 | Prat Urreiztieta | |
| 7,712,516 | B2 | 5/2010 | Gerlach | |
| 7,770,629 | B2 * | 8/2010 | Weicker | B22C 1/188 164/520 |
| 8,460,453 | B2 | 6/2013 | Bohlander | |
| 8,778,449 | B2 | 7/2014 | Tontrup | |
| 2010/0173767 | A1 | 7/2010 | Koch | |
| 2010/0224756 | A1 | 9/2010 | Muller | |
| 2010/0294454 | A1 * | 11/2010 | Muller | B22C 1/185 164/528 |
| 2010/0326620 | A1 | 12/2010 | Muller | |
| 2015/0129155 | A1 | 5/2015 | Koch | |

FOREIGN PATENT DOCUMENTS

| | | | |
|---|---|---|---|
| GB | 1532847 | | 11/1978 |
| JP | 2010131665 | * | 6/2010 |
| JP | 4920794 | | 4/2012 |
| PL | 137376 | | 5/1986 |
| SU | 871997 | | 10/1981 |
| SU | 1577904 | | 7/1990 |
| WO | WO/1994/026440 | * | 11/1994 |
| WO | WO2013182186 | | 12/2013 |
| WO | WO2014059967 | | 4/2014 |
| WO | WO2014059968 | | 4/2014 |
| WO | WO2014059969 | | 4/2014 |

* cited by examiner

MOLDING MATERIAL MIXTURES CONTAINING METAL OXIDES OF ALUMINUM AND ZIRCONIUM IN PARTICULATE FORM

The invention relates to mold material mixtures containing an oxide of aluminum and an oxide of zirconium as a particulate mixed metal oxide, in combination with refractory mold base materials and a water glass-based binder system. The particulate mixed metal oxide in the sense of the invention is a mixture of at least two oxides, a mixture of at least one mixed oxide and at least one oxide or a mixture of mixed oxides. These mixed metal oxides exhibit little or no tendency to react with alkaline water glass at room temperature. The mold material mixtures, also in the form of multicomponent systems, are used for the production of molds and cores for the foundry industry.

PRIOR ART

Casting molds essentially consist of sets of molds and cores, which represent the negative forms of the casting to be produced. These cores and molds consist of a refractory material, for example quartz sand, and a suitable binder, which imparts adequate mechanical strength to the casting mold after removal from the molding tool. Therefore a refractory mold base material enveloped with a suitable binder is used for the production of casting molds. The refractory mold base material is preferably used in free-flowing form so that it can be filled into a suitable hollow mold and compacted there. The binder produces firm cohesion between the particles of the mold base material, so that the casting mold will achieve the required mechanical stability.

Casting molds must meet various requirements. During the actual casting process they must first of all exhibit adequate strength and thermal stability to accommodate the liquid metal in the hollow mold consisting of the one or more casting (partial) molds. After the beginning of the solidification process, the mechanical stability of the casting is guaranteed by a layer of solidified metal that forms along the walls of the casting mold. The material of the casting mold must now decompose under the influence of the heat released by the metal so that it loses its mechanical strength, thus the cohesion between individual particles of the refractory material is abolished. In the ideal case, the casting mold breaks down again into fine sand, which can be easily removed from the casting.

Recently, in addition, it is increasingly demanded that insofar as possible, no air pollution in the form of $CO_2$ or hydrocarbons should be released during the production of the casting and cooling, in order to protect the environment and limit the odor nuisance in the environment due to hydrocarbons (principally aromatic). To meet these demands, in the past few years inorganic binder systems have been developed or further developed, the use of which makes it possible to avoid the emission of $CO_2$ and hydrocarbons during the production of metal molds, or at least minimize it. However, the use of inorganic binder systems often entails other drawbacks, which will be described in detail in the remarks that follow.

Inorganic binders have the drawback in comparison with organic binders that the casting molds produced from them have relatively low strength. This is particularly noticeable immediately after removal of the casting mold from the tool. Good strengths at this time, however, are particularly important for the production of complicated and/or thin-walled moldings and their safe handling. Resistance to atmospheric moisture is also distinctly lower compared with organic binders.

DE 102004042535 A1 (U.S. Pat. No. 7,770,629 B2) discloses that higher initial strengths and higher resistance to atmospheric moisture can be achieved through the use of a refractory mold base material, a water glass-based binder and a share of a particulate metal oxide selected from the group of silicon dioxide, aluminum oxide, titanium oxide and zinc oxide. An added detail is the use of particulate amorphous silicon dioxide.

Inorganic binder systems have the additional drawback compared with organic binder systems that casting molds produced from them often lead to marked sand adhesions and penetrations on the casting, which is associated with considerable cleaning efforts and thus higher costs for the foundries.

In addition the de-coring behavior, i.e., the ability of the casting mold to rapidly disintegrate (upon application of mechanical stress) into a free-flowing form after metal casting is frequently less satisfactory in the case of casting molds produced from purely inorganic materials (e.g., those using water glass as a binder) than in the case of casting molds produced with an organic binder. This last-named property, poorer de-coring behavior, is especially disadvantageous when thin-walled or delicate or complex casting molds, which are theoretically difficult to remove after pouring is complete, are used. For example, so-called water jacket cores, which are needed for producing certain areas in internal combustion engines, may be mentioned.

It is also known that organic components which undergo pyrolysis or reaction under the influence of the hot metal and thus, on one hand, facilitate the disintegration of the casting mold after casting by the formation of pores, and on the other hand, can lead to improved cast surfaces, may be added to the mold material mixture. However, the use of organic components in mold material mixtures leads to emission of $CO_2$ and other pyrolysis products during pouring.

U.S. Pat. No. 3,203,057 discloses mold material mixtures consisting of a fine refractory material, a liquid binder, wherein this is especially an alkali silicate solution, and an $Al_2O_3$-containing active substance, which improves the de-coring behavior of the casting mold after the metal casting. $Al_2O_3$-containing active substances are defined as pure aluminum oxide, known mixed oxides such as aluminosilicates, clay minerals such as bentonite or montmorillonite, naturally occurring $Al_2O_3$-containing active substances such as bauxite and other minerals such as cement and kaolin. The $Al_2O_3$-containing active substances are only described in a very general way here, and there is no accurate information on which of these substances are particular well suited for the de-coring ability of the casting mold, the processing time of the mold material mixture, or the casting surface quality of the castings in question.

U.S. Pat. No. 4,233,076 discloses mold material mixtures consisting of sand, an alkali silicate binder, at least one curing agent selected from the group of alkylene carbonate, an organic monocarboxylic or dicarboxylic acid or a methyl ester thereof, n- or dicarboxylic acid or the methyl ester thereof, carbon dioxide or blast furnace slag, and an $Al_2O_3$-containing substance thereof, the mean particle size distribution of which falls between 0.2 and 5 μm.

It is described that the aluminum oxide-containing solid preferably has a BET surface area of between 3 and 40 $m^2/g$. $Al_2O_3.3H_2O$ is disclosed as preferred.

JP 4920794 B1 discloses mold material mixtures consisting of a foundry sand, an alkali silicate binder and amorphous spheroids made of acidic, spherical aluminum oxide. These amorphous spheroids are supposed to act as so-called "superplasticizers" and support curing, ultimately resulting in greater strength.

Problems with the Prior Art and Statement of the Problem

The inorganic binder systems known up to now for foundry purposes still leave room for improvement. In particular, it is desirable to develop an inorganic binder system which:

(a) allows no or at least a distinctly reduced quantity of emissions of $CO_2$ and organic pyrolysis products, gaseous and/or aerosol, e.g., aromatic hydrocarbons, to form during metal casting,
(b) reaches an appropriate level of strength, which is necessary in automated manufacturing processes, especially adequate hot strength and strength after storage,
(c) makes very good surface quality of the casting possible (even without the use of refractory coatings, so that no post-processing or at least only slight post-processing is necessary,
(d) leads to good disintegration characteristics of the casting mold after the metal casting, so that the casting in question can be removed from the casting mold easily and without residues,
(e) in the case of hot curing and/or $CO_2$ curing, permits the longest possible processing time of the mold material mixture produced with it, and
(f) with a mold base material, yields a flowable mold material mixture, so that casting molds with complex geometry can be made possible.

Therefore the invention was based on the task of supplying a mold material mixture for producing casting molds for metal processing which meets the above-described requirements (a)-(f).

In particular, the mold material mixture according to the invention is characterized by the fact that it improves the casting surface of the castings in question without resorting to the addition of organic additives. This observation can be made especially in the casting of iron and steel, but also in the casting of light metals and nonferrous metals.

SUMMARY OF THE INVENTION

The above described requirements are met with a mold material mixture with the features of the independent claims. Advantageous further embodiments of the mold material mixture according to the invention form the subject matter of the dependent claims or are described in the following.

Surprisingly it was found that the addition of particulate oxides of aluminum and zirconium, particularly along with amorphous particulate silicon dioxide, to the mold material mixture, made it possible to produce casting molds based on inorganic binders that exhibit high strength both immediately after production and with prolonged storage. A particular advantage lies in the fact that after the metal casting, a casting, particularly made of iron or steel, with very high surface quality is obtained, so that after removal of the casting mold, only a little or even no post-processing of the surface of the casting is necessary.

The surface quality of the casting, in question, made of iron or steel, is sometimes even with those surfaces that can be produced with the aid of organically bonded casting molds coated with a refractory layer. A refractory coating can be achieved with so-called sizes, which must be applied to the casting molds after they are produced. The advantage of the mold material mixture produced according to the invention thus lies in the fact that for many casting geometries a coating process can be dispensed with, which means substantial cost savings for the respective foundries.

The mold material mixture preferably does not contain any organic components, so that no emissions of $CO_2$ and other pyrolysis products take place. For this reason the pollution, particularly in the work place, by emissions that are hazardous to health can be reduced. The use of the mold material mixture according to the invention also contributes to reducing climate-damaging emissions (by $CO_2$ and other organic pyrolysis products).

The mold material mixture according to the invention for producing casting molds for metal processing comprises at least:

a) a refractory mold base material;
b) an inorganic binder and
c) at least one particulate mixed metal oxide, wherein the particulate mixed metal oxide
   at least one particulate mixed oxide,
   is a particulate mixture of least two oxides or
   at least one particulate mixed oxide is present along with at least one additional particulate oxide,
   and the particulate mixed metal oxide comprises at least one oxide of aluminum and at least one oxide of zirconium.

The particulate metal oxide has no or at least very low reactivity with the inorganic binder, particularly the alkaline water glass.

DETAILED DESCRIPTION OF THE INVENTION

Figure 2:
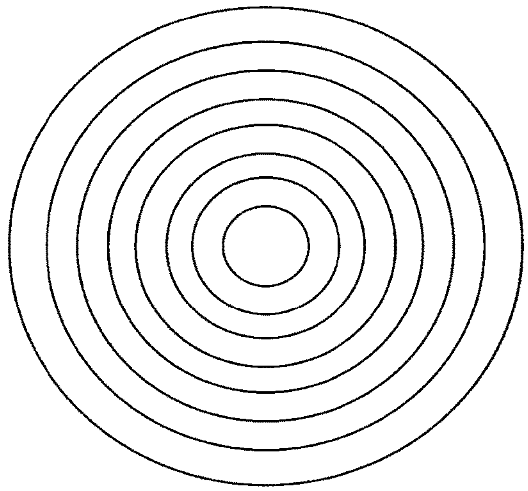
FIG. 2 shows a top plan view of the step core.

The usual materials can be used as refractory mold base material for producing casting molds. The following, for example, are suitable: quartz or chrome ore sand, olivine, vermiculite, bauxite and fireclay, particularly more than 50 wt. % quartz sand based on the refractory mold base material. It is not necessary to use new sand exclusively. Indeed, to save resources and avoid landfilling costs it is even advantageous to use the highest possible fraction of regenerated old sand. The refractory mold base material preferably constitutes more than 80 wt. %, particularly more than 90 wt. % of the mold material mixture.

A suitable regenerated sand is described, for example, in WO 2008/101668 (=US 2010/173767 A1). Also suitable are regenerates obtained by washing and then drying. Usable, but less preferred are regenerates obtained by purely mechanical treatment. As a rule, the regenerate can replace at least about 70 wt. % of the new sand (in the refractory mold base material), preferably at least about 80 wt. % and particularly preferably at least about 90 wt. %. Regenerates of the refractory mold base material that were heated to a temperature of at least 200° C. for regeneration and particularly that were moved during this thermal treatment are preferred.

In addition, synthetic mold materials may also be used as refractory mold base materials, for example glass beads, glass granulate, or the spherical ceramic mold base materials or aluminum silicate micro-hollow spheres (so-called microspheres) known as "Cerabeads" or "Carboaccucast." Such aluminum silicate hollow microspheres are sold, for example, by Omega Minerals Germany GmbH, Norderstedt, in various grades with different aluminum oxide contents under the name "OmegaSpheres." Corresponding products are available, for example, from PQ Corporation (USA) under the name of "Extendospheres."

The mean diameter of the refractory mold base materials as a rule is between 100 μm and 600 μm, preferably between 120 μm and 550 μm and particularly preferably between 150 μm and 500 μm. The mean particle size can be determined, e.g., by sieve analysis according to DIN 66165 (Part 2) with DIN ISO 3310-1 analytical screens. Particularly preferred are particle shapes with ratios of the greatest longitudinal dimension to smallest longitudinal dimension (in arbitrary spatial directions) of 1:1 to 1:5 or 1:1 to 1:3, i.e., those that are not, e.g., fibrous.

In casting experiments, particularly with aluminum, it was found that synthetic mold base materials, especially glass beads, glass granulate or microspheres, can contribute to creating smoother casting surfaces. In this case it is not necessary to make all of the mold base material from the synthetic mold base material. The preferred fraction of the synthetic mold base material is at least about 3 wt. %, advantageously at least wt. %, especially advantageously at least 10 wt. %, preferably at least about 15 wt. %, and particularly preferably at least about 20 wt. %, based on the total quantity of the refractory mold base material.

The refractory mold base material preferably has a free-flowing state, particularly to enable processing of the mold material mixture according to the invention in conventional core shooting machines.

The water glasses as inorganic binders contain dissolved alkali silicates and can be produced by dissolving glass-like lithium, sodium and/or potassium silicates in water. The water glass preferably has a $SiO_2/M_2O$ molar fraction in the range of 1.6 to 4.0, particularly 2.0 to less than 3.5, wherein M represents lithium, sodium or potassium. The binders can also be based on water glasses that contain more than one of the alkali ions mentioned, such as the lithium-modified water glasses known from DE 2652421 A1 (=GB1532847 A). In addition, the water glasses may also contain multivalent ions, for example the Al-modified water glasses described in EP 2305603 A1 (=WO 2011/042132 A1). B-modified water glasses are also possible. The water glasses have a solids fraction in the range of 25 to 65 wt. %, preferably of 30 to 60 wt. %. The solids fraction is based on the quantity of $SiO_2$ and $M_2O$ contained in the water glass. Depending on the application and the desired strength level, between 0.5 wt. % and 5 wt. % of the water glass-based binder are used, preferably between 0.75 wt. % and 4 wt. %, particularly preferably between 1 wt. % and 3.5 wt. %, in each case based on the mold base material. The statements are based on the total quantity of the water glass binder, including the (particularly aqueous) solvent or diluent and the solid fraction, if any (=100%).

Surprisingly it was found that through the addition of the above-mentioned particulate mixed metal oxides to the mold material mixture, casting molds based on inorganic binders can be produced, which not only have high strength immediately after production and after prolonged storage, but also result in good surface quality of the castings, especially those made of iron and steel. Particulate mixed metal oxides containing in each case, in addition to an oxide of aluminum, an oxide of zirconium, not only include pure aluminum oxides and zirconium oxides, but also mixed oxides such as aluminum silicates and zirconium oxide or heterogeneous material mixtures, i.e., material mixtures consisting of several phases, which among other things consist of one or several aluminum oxide-containing and zirconium oxide-containing solids or phases.

The particulate mixed metal oxide according to the invention is preferably selected from one or more members of the group of a) corundum plus zirconium dioxide, b) zirconium mullite, c) zirconium corundum and d) aluminum silicates plus zirconium dioxide and may also optionally contain additional metal oxides. In the case of a non-amorphous material (i.e., crystallinity or partial crystallinity is present), the aluminum silicates are preferably nesosilicates, i.e., the $SiO_4$ moieties (tetrahedral) contained in the structure are not coupled directly to one another (no Si—O—Si linkages); instead, linkages of the tetrahedral $SiO_4$ moieties to one or more Al atoms (Si—O—Al) are present. In the structure of the nesosilicates claimed here, the Al atoms are present in 4-, 5-, and/or 6-fold coordination with oxygen atoms. Typical representatives of these nesosilicates are (according to *Systematik der Minerale nach Strunz* [*Strunz Mineralogical Tables*], 9th ed.), for example, mullite (including fused mullite and sintered mullite as well as $ZrO_2$-containing mullite), sillimanite and other members of the sillimanite group (for example, kyanite or andalusite), wherein particularly preferably kyanite is used from the sillimanite group. Particularly preferred are an amorphous aluminum silicate with more than 50 atom % aluminum atoms based on the total of all silicon and aluminum atoms likewise containing zirconium/zirconium oxide or an aluminum oxide-containing dust, which is produced as a byproduct of zirconium-corundum production and will be described in greater detail below.

Aluminum silicate in the sense of this invention is generally defined as aluminum-silicon mixed oxides, i.e., including alumosilicates and aluminosilicates.

The fineness of the particulate mixed metal oxides according to the invention can be determined by screening. Typically the residue from passing through a screen of 75 μm mesh size (200 mesh) amounts to no more than about 50 wt. %, preferably no more than about 30 wt. %, more preferably no more than about 20 wt. % and particularly preferably no more than about 15 wt. %.

The screen residue is determined by sieve analysis according to DIN 66165 (Part 2) using a machine screening method, wherein according to one embodiment, no sieving aids are used, and according to another embodiment a chain ring is also used as a sieving aid.

The particle shape of the particulate mixed metal oxides can basically be any shape, for example fibrous, splintery, sharp-edged, flaky, round-edged or round. Preferably, however, round-edged and round particle shapes are preferred. Particularly preferably, rounded particle shapes are used, wherein these may be ellipsoid or spherical—spherical are preferred here.

The ratio of the greatest longitudinal dimension to the smallest longitudinal dimension of the respective particle shapes (for all directions in space) is preferably less than 10:1, particularly preferably less than 5:1 and particularly preferably less than 3:1. Since spherical particle shapes are especially advantageous, a ratio of greatest longitudinal dimension to smallest longitudinal dimension of 1.1:1 to 1:1 is ideal.

The mean primary particle size of the particulate mixed metal oxides according to the invention which can be determined with SEM imaging and graphical evaluation is typically greater than 0.01 μm and preferably greater than 0.02 μm. This particle size is also typically less than 50 μm, preferably less than 20 μm, particularly preferably less than 10 μm and especially preferably less than 5 μm.

In addition, the mean specific surface of the particulate mixed metal oxides was determined using gas adsorption measurements (BET method) according to DIN 66131. The specific surface of this substance is typically less than 50 $m^2/g$, preferably less than 30 $m^2/g$, particularly preferably less than 17 $m^2/g$. The specific surface of this substance is typically greater than 0.1 $m^2/g$, preferably greater than 0.5 $m^2/g$, and particularly preferably greater than 1 $m^2/g$.

The zirconium dioxide can be present in the tetragonal or the monoclinic modification.

Particularly preferably, especially for producing smooth casting surfaces, a particulate mixed metal oxide is used which forms as a byproduct in zirconium corundum production and will be described in greater detail in the following. The principal constituents of this dust are $Al_2O_3$, $ZrO_2$ and $SiO_2$, wherein these oxides may be present in various modifications of the pure oxide or in the form of mixed oxides.

The fraction of aluminum, calculated as $Al_2O_3$, in the particulate mixed metal oxide or the dust, is advantageously greater than 25 wt. %, preferably greater than 30 wt. %, particularly preferably greater than 35 wt. % and especially preferably greater than 40 wt. %. The fraction of aluminum, calculated as $Al_2O_3$, in the particulate metal oxide or the dust is usually less than 80 wt. %, preferably less than 70 wt. %, particularly preferably less than 65 wt. % and especially preferably less than 60 wt. %.

The fraction of zirconium calculated as $ZrO_2$ in the particulate mixed metal oxide or the dust is advantageously greater than 2 wt. %, preferably greater than 4 wt. %, particularly preferably greater than 8 wt. %. The fraction of zirconium calculated as $ZrO_2$ in the particulate mixed metal oxide or the dust is usually less than 50 wt. %, preferably less than 40 wt. % and particularly preferably less than 30 wt. %.

The fraction of silicon (other than particulate amorphous silicon oxide), calculated as $SiO_2$, in the particulate mixed metal oxide or the dust, when present, is advantageously greater than 5 wt. %, preferably greater than 15 wt. %, and particularly preferably greater than 20 wt. %. The fraction of silicon calculated as $SiO_2$ in the particulate metal oxide or the dust is usually less than 60 wt. %, preferably less than 50 wt. % and particularly preferably less than 45 wt. %. Other oxides may also be present as contaminants in the particulate mixed metal oxide or the dust, for example $Fe_2O_3$, $Na_2O$, $TiO_2$, MgO and CaO. The fraction of these contaminants according to one embodiment is usually less than 12 wt. %, preferably less than 8 wt. % and particularly preferably less than 4 wt. %.

The aluminum is present in several phases in the heterogeneous dust from zirconium corundum production. Corundum ($\alpha$-$Al_2O_3$) can be determined clearly as the crystalline phase by x-ray powder diffractometry. Such measurements can be performed, for example, on an inherent protection diffractometer from PANalytical (X'pert PW3040), equipped with a primary monochromator and a position-sensitive detector. Small amounts of crystalline synthetic mullite (approximately $Al_{2.4}Si_{0.6}O_{4.8}$) can likewise be found using this method.

In addition to these phases found by x-ray powder diffractometry, $^{27}Al$ solid state NMR measurements indicate that additional aluminum-containing phases are present, which—according to the inventors' conjectures—are amorphous. Such measurements can be performed, for example, using a BRUKER AVANCE DSX 500 Spectrometer (magnetic flux density 11.74 Tesla) with the Magic-Angle-Spinning technique (MAS, about 25 kHz).

With scanning electron microscopic images (SEM images produced with, e.g., Nova NanoSEM 230 from FEI), details of the primary particle form can be visualized down to the order of magnitude of 0.01 μm. In addition to sharp-edged and splintery particles, a large number of spherical particles were identified, which exhibit a low degree of agglomeration and/or intergrowth with one another.

The mean primary particle size of the spherical particles can be determined from SEM images (by graphical analysis) can amount to between 0.01 μm and 10 μm, especially between 0.02 μm and 5 μm, particularly preferably between 0.02 μm and 2 μm. Through the EDX unit integrated in the scanning electron microscope, the elemental composition of the spherical particles can be determined by energy-dispersive X-ray analysis. The detection of the secondary electrons was performed by an in-lens SE detector (TLD-SE). The energy-dispersive X-ray analysis was performed by an EDAX system. It was found during this study that most of the spherical particles consist of aluminum silicate.

The inventors suggest, without being bound by theory, that these spherical aluminum silicate particles are amorphous and that the presence of such particles in the mold material mixture has an advantageous effect on the compaction thereof and on the surface quality of the corresponding casting. This is observed both in iron and steel casting and in aluminum casting, and therefore the use of this aluminum oxide- and zirconium oxide containing dust from zirconium corundum production is particularly preferred.

The particulate mixed metal oxide according to the invention relative to the fraction of oxides or mixed oxides comprising at least one oxide of aluminum and at least one oxide of zirconium is between 0.05 wt. % and 2.0 wt. %, preferably between 0.1 wt. % and 2.0 wt. %, particularly preferably between 0.1 wt. % and 1.5 wt. % and especially preferably between 0.2 wt. % and 1.2 wt. % or even between 0.2 wt. % and 0.8 wt. %, in the mold material composition, in each case based on the mold base material, of is added to the mold material composition in the above fractions.

In an additional, preferred embodiment, a fraction of a particulate amorphous $SiO_2$ may be added to the mold material mixture according to the invention to increase the strength of the casting molds produced with such mold material mixtures. An increase in the strength of the casting molds, particularly an increase in the hot strength, can be advantageous in the automated manufacturing process. The particulate amorphous silicon dioxide advantageously has a particle size of less than 300 μm, preferably less than 200 μm, particularly preferably less than 100 μm, and has e.g., a mean primary particle size of between 0.05 μm and 10 μm. The particle size can be determined by sieve analysis. Particularly preferably the screen residue on a screen with a mesh size of 63 μm is less than 10 wt. %, preferably less than 8 wt. %.

The determination of the particle size of the screen residue is performed by sieve analysis according to DIN 66165 (Part 2) using a mechanical screening method, wherein according to one embodiment no sieving aids are used, and according to another embodiment a chain ring is also used as a sieving aid. The primary particle size is determined by dynamic light scattering and can be checked by SEM.

The particulate amorphous silicon dioxide can be added as part of the particulate mixed metal oxide or separately.

Regardless, the statements made here regarding the concentration of the particulate mixed metal oxide and the particulate amorphous silicon dioxide are to be understood as being without the other component(s) respectively. In case of doubt, the components must be calculated.

The amorphous $SiO_2$ preferably used according to the present invention has a water content of less than 15 wt. %, especially less than 5 wt. % and particularly preferably less than 1 wt. %. In particular, the amorphous $SiO_2$ is added as a powder.

The amorphous $SiO_2$ used can be synthetically produced or naturally occurring silicas. However, the latter, known, e.g., from DE 102007045649, are not preferred, since as a rule they contain substantial crystalline fractions and therefore are classified as carcinogenic. Synthetic amorphous $SiO_2$ is defined as not naturally occurring material, i.e., the production thereof comprises a chemical reaction, e.g., the production of silica sols by ion exchange processes from alkali silicate solutions, the precipitation from alkali silicate solutions, the flame hydrolysis of silicon tetrachloride, the reduction of quartz sand with coke in an electric arc furnace during the production of ferrosilicon and silicon. The amorphous $SiO_2$ produced according to the two last-mentioned methods is also known as pyrogenic $SiO_2$.

Sometimes, synthetic amorphous $SiO_2$ is defined only as precipitated silica (CAS-No. 112926-00-8) and $SiO_2$ produced by flame hydrolysis (Pyrogenic Silica, Fumed Silica, CAS No. 112945-52-5), whereas the product produced during the manufacturing of ferrosilicon or silicon is merely designated as amorphous $SiO_2$ (Silica Fume, Microsilica, CAS No. 69012-64-12). For the purpose of the present invention, the product obtained during the production of ferrosilicon or silicon will also be called amorphous $SiO_2$.

Precipitated and pyrogenic $SiO_2$, i.e., the latter produced by flame hydrolysis or in an electric arc, are preferably used. Especially preferably used is amorphous $SiO_2$ produced by thermal degradation of $ZrSiO_4$ (cf. DE 102012020509: the zirconium fraction is added as $ZiO_2$ to the particulate mixed metal oxide, and the other fraction to amorphous silicon dioxide) and $SiO_2$ produced by oxidation of metallic Si using an oxygen-containing gases (cf. DE 102012020510). Also preferred is powdered quartz gas (principally amorphous $SiO_2$), produced from crystalline quartz by melting and rapid recooling, so that the particles are present in spherical rather than splintery shape (cf. DE 102012020511). The mean primary particle size of the synthetic amorphous silicon dioxide can be between 0.05 μm and 10 μm, particularly between 0.1 μm and 5 μm, particularly preferably between 0.1 μm and 2 μm. The primary particle size can be determined, e.g., using dynamic light scattering (e.g., Horiba LA 950) and checked by scanning electron microscopic imaging (SEM images with e.g., Nova NanoSEM 230 from FEI).

In addition, details of the primary particle form can be visualized down to the order of magnitude of 0.01 μm using SEM imaging. For the SEM measurements, the $SiO_2$ samples were dispersed in distilled water and then applied to an aluminum holder bonded to a copper strip before evaporating the water.

In addition, the specific surface of the synthetic amorphous silicon dioxide was determined using gas adsorption measurements (BET method) according to DIN 66131. The specific surface of the synthetic amorphous $SiO_2$ is between 1 and 200 $m^2/g$, particularly between 1 and 50 $m^2/g$, particularly preferably between 1 and 30 $m^2/g$. Optionally, the products may also be mixed, e.g., to selectively obtain mixtures with certain particle size distributions.

The purity of the amorphous $SiO_2$ can vary greatly, depending on the production method and the producer. Suitable types were found to be those containing at least 85 wt. % $SiO_2$, preferably at least 90 wt. % and particularly preferably at least 95 wt. %. Depending on the use and the desired strength, between 0.1 wt. % and 2 wt. % of the particulate amorphous $SiO_2$ is used, preferably between 0.1 wt. % and 1.8 wt. %, particularly preferably between 0.1 wt. % and 1.5 wt. %, in each case based on the mold base material.

The ratio of water glass binder to particulate mixed metal oxide and amorphous $SiO_2$ if present can be varied within broad limits. This offers the advantage of greatly improving the initial strengths of the cores, i.e., the strength immediately after removal from the tool, without substantially affecting the final strengths. This is of great interest especially in light metal casting. On one hand, high initial strengths are desired in order to be able to transport the cores or combine them into whole core packets without problems immediately after their production, and on the other hand, the final strengths should not be too great, in order to avoid problems during core disintegration after pouring, i.e., the mold base material should be able to removed from the casting mold cavities without problems immediately after casting.

Based on the weight of the binder (including diluent and solvent), the amorphous $SiO_2$ is preferably present at a fraction of 2 to 60 wt. %, particularly preferably of 3 to 55 wt. % and especially preferably between 4 and 50 wt. %, or particularly preferably based on the ratio of the solids fraction of the water glass to amorphous $SiO_2$ of 10:1 to 1:1.2 (parts by weight).

The addition of the amorphous $SiO_2$ according to EP 1802409 B1 can take place both before and after the binder addition, directly to the refractory material, but also, as described in EP 1884300 A1 (=US 2008/029240 A1), first a premix of $SiO_2$ with at least one part of the binder or sodium hydroxide can be produced and this can then be mixed in to the refractory material. The binder or binder fraction which may still be present and was not used for the premix can be added to the refractory material before or after the addition of the premix or together with this. Preferably the amorphous $SiO_2$ is added to the refractory material before the binder addition.

In an additional embodiment, barium sulfate may be added to the mold material mixture (DE 102012104934) to further improve the surface of the casting, especially in light metal casting, for example aluminum casting. The barium sulfate can be synthetically produced as well as natural barium sulfate, i.e., it may be added in the form of minerals containing barium sulfate, such as heavy spar or barite. Synthetically produced barium sulfate (also called Blanc Fixe) is produced, for example, with the aid of a precipitation reaction.

For this purpose, usually soluble barium compounds (barium salts) are dissolved in water. Then the poorly soluble barium sulfate is precipitated by the addition of soluble sulfate salts (e.g., sodium sulfate) or sulfuric acid. The precipitated barium sulfate is filtered off, dried and possibly ground.

Natural barium sulfate is obtained as the crude ore and then processed by various methods (e.g., density sorting, grinding etc.). Preferably the barium sulfate has a purity of more than 85 wt. %, particularly preferably of more than 90 wt. %.

The naturally obtained barium sulfate can, for example, contain calcium fluoride as a contaminant. The fraction of calcium fluoride can typically be about 5% based on the total weight of the natural barium sulfate.

The mean particle size of the barium sulfate to be used according to the invention is preferably between 0.1 μm and 90 μm. The particle size distribution can be determined, for example, using dynamic light scattering (e.g., Horiba LA 950).

Preferably the screen residue on a screen with a mesh size of 45 μm is less than 20 wt. %, particularly preferably less than 10 wt. %, especially preferably less than 5 wt. %. The screen residue is determined by sieve analysis according to DIN 66165 (Part 2) using a machine screening method, wherein according to one embodiment no screening aids are used and according to another embodiment a chain ring is additionally used as a screening aid.

The barium sulfate is preferably added in a quantity of 0.02 to 5.0 wt. %, particularly preferably 0.05 to 3.0 wt. %, particularly preferably 0.1 to 2.0 wt. % or 0.3 to 0.99 wt. %, in each case based on the total mold material mixture.

According to a further embodiment, other substances characterized by low wetting with molten aluminum may be added to the mold material mixture according to the invention, e.g., boron nitride.

Such a mixture of substances with low wettability, containing barium sulfate, among other substances, aw a low wettability agent, can likewise lead to a smooth casting surface free from sand adhesion. Based on the total quantity of substances of little or no wettability, the fraction of the barium sulfate should be greater than 5 wt. %, preferably greater than 10 wt. %, particularly preferably greater than 20 wt. % or greater than 60 wt. %.

The upper limit is pure barium sulfate; in this case the fraction of the barium sulfates in the non-wettable substances is 100 wt. %. The mixture of substances with little or no wettability is preferably added in a quantity of 0.02 to 5.0 wt. %, particularly preferably 0.05 to 3.0 wt. %, particularly preferably 0.1 to 2.0 wt. % or 0.3 to 0.99 wt. %, in each case based on the mold material mixture.

In an additional embodiment the mold material mixture according to the invention can comprise a phosphorus-containing compound. This addition is preferred in the case of very thin-walled sections of a casting mold. It preferably comprises inorganic phosphorus compounds, in which the phosphorus is preferably present in the +5 oxidation step. Through the addition of phosphorus-containing compounds, the stability of the casting mold can be further increased. This is particularly importance when the liquid metal strikes an inclined surface during metal casting and exerts a high eroding effect there because of the high metallostatic pressure or can lead to deformations of particularly thin-walled sections of the casting mold.

The phosphorus-containing compound is preferably present in the form of a phosphate or phosphorus oxide. The phosphate can be present as an alkali or alkaline earth metal phosphate, wherein alkali metal phosphates and especially the sodium salts thereof are preferred.

Theoretically ammonium phosphates or phosphates of other metal ions may also be used. The alkali or alkaline earth metal phosphates named as preferred, however, are readily available in any desired quantities at reasonable cost.

Phosphates of higher valence metal ions, particularly trivalent metal ions, are not preferred. It was observed that when such phosphates of higher valence metal ions, particularly trivalent metal ions, are used, the processing time of the mold material mixture is shortened. If the phosphorus-containing compound of the mold material mixture is added in the form of a phosphorus oxide, the phosphorus oxide is preferably in the form of phosphorus pentoxide. However, phosphorus trioxide- and phosphorus tetroxide may also be used.

Orthophosphates as well as polyphosphates, pyrophosphates or metaphosphates may also be used as phosphates. The phosphates can, for example, be produced by neutralization of the corresponding acids with a corresponding base, for example an alkali metal base, such as NaOH, or optionally also an alkaline earth metal base, wherein not all negative charges of the phosphate need to be saturated with metal ions.

Metal phosphates as well as metal hydrogen phosphates and metal dihydrogen phosphates may be used, for example $Na_3PO_4$, $Na_2HPO_4$, and $NaH_2PO_4$. The anhydrous phosphates as well as hydrates of the phosphates may be used. The phosphates can be introduced into the mold material mixture in crystalline or amorphous form.

Polyphosphates are particularly defined as linear phosphates which contain more than one phosphorus atom, wherein the phosphorus atoms are linked together over oxygen bridges. Polyphosphates are obtained by condensation of orthophosphate ions with splitting off of water, so that a linear chain of $PO_4$ tetrahedra connected with one another via their corners is obtained. Polyphosphates have the general formula $(O(PO_3)n)^{(n+2)}$, wherein n corresponds to the chain length. A polyphosphate can comprise up to several hundred PO4 tetrahedra. However, polyphosphates with shorter chain lengths are preferably used. Preferably n has values from 2 to 100, particularly preferably 5 to 50. More highly condensed polyphosphates may also be used, i.e., polyphosphates in which the $PO_4$ tetrahedra are linked together over more than two corners and therefore exhibit polymerization in two or three dimensions.

Metaphosphates are defined as cyclic structures made up of $PO_4$ tetrahedra connected together by their corners. Metaphosphates have the general formula $((PO_3)n)^{n-}$, wherein n is at least 3. Preferably n has values of 3 to 10.

Both individual phosphates and mixtures of various phosphates and/or phosphorus oxides may be used.

The preferred fraction of the phosphorus-containing compound, based on the refractory mold base material, is between 0.05 and 1.0 wt. %. At a fraction of less than 0.05 wt. %, no definite effect on the dimensional stability of the casting mold is seen. If the phosphate fraction exceeds 1.0 wt. %, the hot strength of the casting mold decreases greatly. Preferably the fraction of the phosphorus-containing compound is selected between 0.1 and 0.5 wt. %.

The phosphorus-containing inorganic compound preferably contains between 40 and 90 wt. %, particularly preferably between 50 and 80 wt. % phosphorus, calculated as $P_2O_5$. The phosphorus-containing compound itself can be added to the mold material mixture in solid or dissolved form. Preferably the phosphorus-containing compound is added to the mold material mixture as a solid. If the phosphorus-containing compound is added in dissolved form, water is preferred as the solvent. It was found as an additional advantage of the addition of a phosphorus-containing compound to mold material mixtures for producing casting molds that the molds exhibit very good disintegration after the metal casting. This is true for metals that require lower casting temperatures, such as light metals, particularly aluminum. In the case of iron casting, higher temperatures of more than 1200° C. affect the casting mold, so that an increased risk of vitrification of the casting mold and thus worsening of the characteristics exists.

In an additional embodiment, organic compounds (according to EP 1 802 409 B1 and WO 2008/046651) can be added to the mold material mixture according to the invention. Addition of small amounts of organic compounds can be advantageous for specific applications—for example, to regulate the thermal expansion of the cured mold material mixture. However, such an addition is not preferred, since this is once again associated with emissions of $CO_2$ and other pyrolysis products.

Binders that contain water generally exhibit inferior flowability compared to binders based on organic solvents. This means that molding tools with narrow passages and multiple changes of directions cannot be filled as well.

As a result, the cores may have sections with inadequate compaction, which in turn can result in casting errors during pouring. According to an advantageous embodiment, the mold material mixture according to the invention contains a fraction of flake-type lubricants, particularly graphite or $MoS_2$. Surprisingly it has been found that upon addition of such lubricants, particularly graphite, even complex molds with thin-walled sections can be produced, wherein the casting molds continuously have a uniform, high density and strength, so that essentially no casting flaws were observed during casting. The quantity of flake-type lubricant added, particularly graphite, preferably amounts to 0.05 to 1 wt. %, particularly preferably 0.05 to 0.5 wt. %, based on the mold base material.

In addition, surface-active substances may be used, particularly surfactants, to improve the fluidity of the mold material mixture. Appropriate representatives of these compounds are described, e.g., in WO 2009/056320 (=US 2010/0326620 A1). Particularly surfactants with sulfate or sulfonate groups may be mentioned here.

A surface-active substance is defined as a substance that can form a monomolecular layer on an aqueous surface, and thus for example is capable of forming a membrane. In addition, a surface-active substance reduces the surface tension of water. Suitable surface-active substances are, for example, silicone oils.

Particularly preferably the surface-active substance is a surfactant. Surfactants comprise a hydrophilic part (head) and a long hydrophobic part (tail) which are sufficiently balanced in their characteristics that the surfactants for example can form micelles in an aqueous phase or can become enriched at the interface.

Inherently all classes of surfactants can be used in the mold material mixture according to the invention. In addition to anionic surfactants, nonionic surfactants, cationic surfactants and amphoteric surfactants may also be used.

Examples of nonionic surfactants are, for example, ethoxylated or propoxylated long-chain alcohols, amines or acids, such as fatty alcohol ethoxylates, alkylphenol ethoxylates, fatty amine ethoxylates, fatty acid ethoxylates, the corresponding propoxylates or sugar surfactants, for example fatty alcohol-based polyglycosides. The fatty alcohols preferably comprise 8 to 20 carbon atoms. Suitable cationic surfactants are akylammonium compounds and imidazolinium compounds.

Preferably, anionic surfactants are used for the mold material mixture according to the invention. As a polar, hydrophilic group, the anionic surfactant preferably comprises a sulfate, sulfonate, phosphate or carboxylate group, wherein sulfate and phosphate groups are particularly preferred. If sulfate group-containing anionic surfactants are used, preferably the monoesters of the sulfates are used. If phosphate groups are used as the polar group of the anionic surfactant, the mono- and diesters of orthophosphoric acid are particularly preferred.

The surfactants used in the mold material mixture according to the invention have in common the fact that the nonpolar, hydrophobic part (tail) is preferably formed by alkyl, aryl and/or aralkyl groups that preferably comprise more than 6 carbon atoms, particularly preferably 8 to 20 carbon atoms. The hydrophobic part can have both linear chains and branched structures. Likewise, mixtures of various surfactants may be used. Particularly preferred anionic surfactants are selected from the group of oleyl sulfates, stearyl sulfate, palmityl sulfate, myristyl sulfate, lauryl sulfate, decyl sulfate, octyl sulfate, 2-ethylhexyl sulfate, 2-ethyloctyl sulfate, 2-ethyldecyl sulfate, palmitoleyl sulfate, linolyl sulfate, lauryl sulfonate, 2-ethyldecyl sulfonate, palmityl sulfonate, stearyl sulfonate, 2-ethylstearyl sulfonate, linolyl sulfonate, hexyl phosphate, 2-ethylhexyl phosphate, capryl phosphate, lauryl phosphate, myristyl phosphate, palmityl phosphate, palmitoleyl phosphate, oleyl phosphate, stearyl phosphate, poly-(1,2-ethanediyl)-phenol hydroxyphosphate, poly-(1,2-ethanediyl)-stearyl phosphate, and poly-(1,2-ethanediyl)-oleyl phosphate.

In the mold material mixture according to the invention, the pure surface-active substance, based on the weight of the refractory mold base material, is preferably present in a fraction of 0.001 to 1 wt. %, particularly preferably 0.01 to 0.2 wt. %. Frequently such surface-active substances are marketed commercially as 20% to 80% solutions. In this case, the aqueous solutions of the surface-active substances are particularly preferred.

Basically, the surface-active substance can be added to the mold material mixture in dissolved form, for example in the binder, as a separate component or via a solid component that functions as a carrier material, for example in an additive. Particularly preferably the surface-active substance is dissolved in the binder.

In addition to the constituents mentioned, the mold material mixture according to the invention may comprise additional additives. For example, internal release agents may be added to facilitate the detachment of the casting molds from the molding tool. Suitable internal release agents are, e.g., calcium stearate, fatty acid esters, waxes, natural resins or special alkyd resins.

In addition, silanes may also be added to the mold material mixture according to the invention to increase the stability of the molds and cores against high atmospheric moisture and/or against water-based mold coatings. According to a further preferred embodiment, the mold material mixture according to the invention contains a fraction of at least one silane. Suitable silanes are, for example, aminosilanes, epoxysilanes, mercaptosilanes, hydroxysilanes and ureidosilanes. Examples of suitable silanes are aminopropyltrimethoxysilane, hydroxypropyl-trimethoxysilane, 3-ureidopropyltriethoxysilane, mercaptopropyltrimethoxysilane, glycidoxypropyltrimethoxysilane, (3,4-epoxycyclohexyl)trimethoxysilane and N(aminoethyl)-aminopropyltrimethoxysilane. Based on the binder, typically 0.1 to 2 wt. % silane are used, preferably 0.1 to 1 wt. %. Additional suitable additives are alkali metal siliconates, e.g., potassium methylsiliconate, of which 0.5 to 15 wt. %, preferably 1 to 10 wt. % and particularly preferably 1 to 5 wt. % based on the binder can be used. If the mold material mixture contains silanes and/or alkali methyl siliconates, they are usually added by incorporating them in the binder in advance. However, they can also be added to the molding material as separate components.

The mold material mixture according to the invention represents an intensive mixture of at least the constituents mentioned. The particles of the refractory mold base material are preferably coated with a layer of the binder. Firm cohesion between the particles of the refractory mold base material can be achieved by evaporating the water present in the binder (about 40-70 wt. %, based on the weight of the binder).

Despite the high strengths achievable with the binder system according to the invention, after pouring, the casting molds produced with the mold material mixture according to the invention exhibit surprisingly good disintegration, so that the mold material mixture can easily be poured even out of constricted and angled sections of the casting mold again after casting. The molds produced from the mold material mixture according to the invention are generally suitable for casting metals, for example light metals, nonferrous metals or ferrous metals. However, the mold material mixture according to the invention is especially suitable for the casting of ferrous metals.

The invention further relates to a method for producing casting molds for metal processing using the mold material mixture according to the invention. The method according to the invention comprises the steps of:

Preparing the above described mold material mixture;

Molding the mold material mixture;

Curing the molded mold material mixture, whereupon the cured casting mold is obtained.

The mold material mixture is preferably prepared in form of a multi component system comprising at least the following components (A), (B) and optionally (F), existing spatially separated from one another:

(A) a powdered additive component comprising at least
one particulate mixed metal oxide, wherein the mixed particulate metal oxide
at least one particulate mixed oxide or
is a particulate mixture of at least two oxides or
at least one particulate mixed oxide is present along with at least one additional particulate oxide or in addition to at least one other particulate mixed oxide, and the particulate mixed metal oxide comprises at least one oxide of aluminum and at least one oxide of zirconium, and no water glass; and (B) a liquid binder component (B) comprising at least water glass containing water; and optionally (F) a free-flowing refractory component (F) comprising a refractory mold base material and no water glass.

Each of the additional constituents of the components is defined in further detail in the following. Specifically, the previously mentioned additional constituents can preferably be assigned to the components (A), (B) and (F) as follows:

Component (A) (additive component): particulate amorphous $SiO_2$, barium sulfate, phosphorus-containing compound (as solid), organic compounds;

Component (B) (binder component): surfactants; phosphorus-containing compound (if water-soluble);

Component (F) (refractory component): synthetic mold materials.

Using the multicomponent system, the mold material mixtures can be produced by combining the components in the required quantities or by supplying the components with the required quantities of the constituents defined more specifically in the preceding.

In the production of the mold material mixture according to the invention, the procedure generally followed is that first the refractory mold base material is placed in the vessel, and then the binder is added while stirring. In this process the water glass and the particulate mixed metal oxide according to the invention can inherently be added in arbitrary order.

The additives described in the preceding can inherently be added to the mold material mixture in any desired form. They can be introduced individually or as a mixture. According a preferred embodiment, the binder is prepared as a two-component system, wherein a first liquid component contains the water glass and optionally (see the preceding) and a second solid component comprises the particulate mixed metal oxide according to the invention with optionally one or more of the above described components, synthetic amorphous silicon dioxide, carbohydrate, phosphates, a preferably flake-type lubricant and/or barium sulfate, especially synthetic amorphous silicon dioxide.

In the production of the mold material mixture, the refractory mold base material is placed in a mixer and then preferably first the solid component(s) in the form of particulate mixed metal oxides, and optionally amorphous silicon dioxide, barium sulfate or additional powdered solids are added and mixed with the refractory mold base material.

The duration of mixing is selected such that intimate mixing of the refractory mold base material and added solid takes place. The duration of mixing depends on the quantity of the mold material mixture to be prepared and the mixing apparatus used. Preferably the duration of mixing is chosen to be between 1 and 5 minutes. Then preferably with continued stirring of the mixture, the liquid component of the binder is added and then the mixture is mixed further until a uniform layer of the binder has formed on the granules of the refractory mold base material. Here also, the duration of mixing depends on the amount of the mold material mixture to be produced and the mixing apparatus used. Preferably the duration of the mixing process is selected to be between 1 and 5 minutes. A liquid component is defined as either a mixture of various liquid components or the totality of all individual liquid components, wherein the latter can also be added individually. Similarly, a solid component is defined as either the mixture of individual solid components or the totality of all of the above-described solid components, wherein the latter may be added to the mold material mixture individually or one by one. According to another embodiment, first the liquid component of the binder can be added to the refractory mold base material and only thereafter, the solid component may be added to the mixture. According to a further embodiment, first 0.05 to 0.3% water, based on the weight of the mold base material, is added to the refractory mold base material, and only thereafter are the solid and liquid components of the binder added.

In this embodiment, a surprisingly positive effect on the processing time of the mold material mixture can be achieved. The inventors assume that the water-withdrawing effect of the solid component of the binder is reduced in this way, and the full curing process is correspondingly delayed. The mold material mixture is then brought into the desired form. In this process, the customary molding are used. For example, the mold material mixture can be shot into the molding tool with a core shooting machine using compressed air. The mold material mixture is then fully cured, wherein all methods known for water glass-based binders may be used, e.g., hot curing, gassing with $CO_2$ or air or a combination of both and curing with liquid or solid catalysts.

Hot curing in which the mold material mixture is exposed to a temperature of 100° C. to 300, preferably 120 to 250° C. During hot curing, water is drawn from the mold material mixture water. As a result, it is believed that condensation reactions are also initiated between silanol groups, so that crosslinking of the water glasses takes place.

For example, heating can take place in a molding tool, preferably having a temperature of 100 to 300° C., particularly preferably a temperature of 120 to 250° C. It is possible to cure the casting mold completely even in the molding tool. However, it is also possible to cool only the exterior areas of the casting mold, so that it has adequate strength to be removed from the molding tool. The casting mold can then be cured completely by withdrawing additional water. This can be done, for example, in a kiln. The withdrawal of water may also take place, for example, by withdrawing the water under reduced pressure.

The curing of the casting molds can be accelerated by blowing heated air into the molding tool. In this embodiment of the method, removal of the water contained in the binder is accomplished, so that the casting mold is consolidated within time periods suitable for industrial application. The temperature of the air blown in is preferably 100° C. to 180° C., particularly preferably 120° C. to 150° C.

The flow velocity of the heated air is preferably adjusted such that curing of the casting mold within time periods suitable for industrial application is accomplished. The time periods depend on the size of the casting molds produced. Curing within less than 5 minutes, preferably less than 2 minutes is desired. However, in the case of very large casting molds, longer time periods may be necessary.

The removal of the water from the mold material mixture can also be accomplished by heating the mold material mixture by microwave irradiation. However, microwave irradiation is preferably performed after the casting mold was removed from the molding tool.

For this purpose, however, the casting mold must already have adequate strength. As was explained previously, this can be achieved, for example, if at least one outer shell of the casting mold is already cured in the molding tool.

The methods according to the invention are inherently suitable for the production of all casting molds customarily employed for metal casting, thus for example of cores and molds.

The casting molds produced from the mold material mixture according to the invention or with the method according to the invention exhibit high strength immediately after production, without the strength of the casting molds after curing being so high that difficulties occur during removal of the casting mold after the production of the casting. In addition, these casting molds exhibit high stability in the presence of elevated atmospheric humidity, i.e., surprisingly the casting molds can also be stored without problems over long periods of time. As an advantage, the casting mold exhibits a very high stability under mechanical loading, so that even thin-walled sections of the casting mold can be implemented without being deformed by the metallostatic pressure in the casting process. Thus an additional object of the invention is a casting mold that was obtained by the above described method according to the invention.

In the following, the invention will be explained on the basis of examples, without being limited to these.

Examples

1) Effects of Various Aluminum Oxide-Containing Powders on the Bending Strength and on the Processing Time For testing a mold material mixture, so-called Georg Fischer test bars were produced. Georg Fischer test bars are test bars of rectangular cross section with dimensions of 150 mm×22.36 mm×22.36 mm. The compositions of the mold material mixtures are shown in Table 1. The following procedure was used for producing the Georg Fischer test bars:

- The components listed in Table 1 were mixed in a laboratory paddle mixer (Vogel & Schemmann AG, Hagen, DE). First the quartz sand was placed in the mixer and the water glass was added while stirring.
- The water glass used was a sodium water glass that contained fractions of potassium. In the tables that follow, therefore, the molar fraction is given as $SiO_2$:$M_2O$, wherein M is the sum of sodium and potassium. After the mixture had been stirred for one minute, optionally amorphous $SiO_2$ and/or barium sulfate was added with continued stirring. The mixture was then stirred for an additional minute.
- The mold material mixtures were transferred to the storage bunker of a H 2.5 Hot-Box core shooting machine from Röperwerk-Gießereimaschinen GmbH, Viersen, DE, the molding tool of which was heated to 180° C.
- The mold material mixtures were introduced into the molding tool using compressed air (5 bar) and remained in the molding tool for an additional 35 seconds.
- To accelerate the curing of the mixtures. during the last 20 seconds hot air (2 bar, 100° C. on entry into the tool) was passed through the molding tool.
- The molding tool was opened and the test bars removed.

To determine the bending strength, the test bars were placed in a Georg Fischer strength testing apparatus equipped with a 3-point bending device (DISA Industrie AG, Schaffhausen, CH) and the force causing the test bars to break was measured. The bending strengths were measured after the following plan:

- 10 seconds after removal (hot strength)
- 1 hour after removal (cold strength)
- 10 seconds after removal (hot strength) of the mold material mixture stored for 1 h (without air change).
- 10 seconds after removal (hot strength) of the mold material mixture stored for 2 h (without air change).

Result

Comparison of the bending strength of mixtures 1.01 and 1.02 shows that both the hot strength and the cold strength are increased by the addition of an amorphous $SiO_2$-powders. This is in agreement with the prior art as described in DE 102004042535 A1.

Comparison of mixture 1.02 with mixtures 1.03 to 1.09 clearly indicates that aluminum oxide-containing powder not according to the invention leads to poorer strengths or reduces the processing time of the mold material mixture (cf. strength values of mixture 1.08). On the other hand, mixtures according to the invention 1.10 and 1.11 show that there is little or no effect on the strengths. The processing time (greater than 2 h) is also adequate.

TABLE 1

Compositions of the mold material mixtures

| | Quartz sand H32 | Alkali water glass | Amorphous $SiO_2$ | Additive | |
|---|---|---|---|---|---|
| 1.01 | 100 PBW | 2.0 PBW [a)] | — | — | Compar. |
| 1.02 | 100 PBW | 2.0 PBW [a)] | 0.5 PBW [b)] | — | Compar. |
| 1.03 | 100 PBW | 2.0 PBW [a)] | 0.5 PBW [b)] | 0.5 PBW [c)] | Compar. |
| 1.04 | 100 PBW | 2.0 PBW [a)] | 0.5 PBW [b)] | 0.5 PBW [d)] | Compar. |
| 1.05 | 100 PBW | 2.0 PBW [a)] | 0.5 PBW [b)] | 0.5 PBW [e)] | Compar. |
| 1.06 | 100 PBW | 2.0 PBW [a)] | 0.5 PBW [b)] | 0.5 PBW [f)] | Compar. |

TABLE 1-continued

| Compositions of the mold material mixtures | | | | | |
|---|---|---|---|---|---|
| | Quartz sand H32 | Alkali water glass | Amorphous $SiO_2$ | Additive | |
| 1.07 | 100 PBW | 2.0 PBW $^{a)}$ | 0.5 PBW $^{b)}$ | 0.5 PBW $^{g)}$ | Compar. |
| 1.08 | 100 PBW | 2.0 PBW $^{a)}$ | 0.5 PBW $^{b)}$ | 0.5 PBW $^{h)}$ | Compar. |
| 1.09 | 100 PBW | 2.0 PBW $^{a)}$ | 0.5 PBW $^{b)}$ | 0.5 PBW $^{l)}$ | acc. to invent. |
| 1.10 | 100 PBW | 2.0 PBW $^{a)}$ | 0.5 PBW $^{b)}$ | 0.5 PBW $^{m)}$ | acc. to invent. |

PBW = parts by weight;
compar. = not according to the invention;
acc. to invent. = according to the invention The superscripts in Table 1 have the following respective meanings:

a) Alkali water glass with a $SiO_2$:$M_2O$ weight fraction of about 2.1, based on the total water glass. solids content of about 35% b) Microsilica white GHL DL971W (amorphous $SiO_2$, RW silicium GmbH; formed during the metallurgical manufacture of silicon in an electric arc furnace)

c) AEROXIDE Alu 130 (pyrogenic aluminum oxide with a BET surface area of 130 $m^2$/g; Evonik Industries AG)

d) AEROXIDE Alu 65 (pyrogenic aluminum oxide with a BET-surface area of von 65 $m^2$/g; Evonik Industries AG)

e) ARGICAL-M 1000 (metakaolin, calc. kaolin, amorphous material consisting of lamellar particles, BET surface area of von 17 $m^2$/g; AGS Mineraux (IMERYS))

f) ARGICAL-M 1200S (metakaolin, calc. kaolin, amorphous material consisting of lamellar particles, BET surface area of 19 $m^2$/g; AGS Mineraux (IMERYS))

g) Kaolin FP 80 ground (BET surface area of 19 $m^2$/g; Dorfner)

h) ARGICAL C88 R (kaolinite, BET surface area of 13 $m^2$/g; AGS Mineraux (IMERYS))

i) ALODUR FZM S (fused zirconia mullite, Treibacher Schleifmittel)

j) ALODUR ZKSF (dust-type byproduct of zirconium corundum-production, Treibacher Schleifmittel)

TABLE 2

| Bending strength | | | | | |
|---|---|---|---|---|---|
| | Hot strength [N/cm$^2$] | Strengths after 1 h [N/cm$^2$] | Hot strengths (PT 1 h) [N/cm$^2$] | Hot strength (PT 2 h) [N/cm$^2$] | |
| 1.01 | 90 | 410 | — | — | Compar. |
| 1.02 | 150 | 470 | 145 | 150 | Compar. |
| 1.03 | 55 | 200 | — | — | Compar. |
| 1.04 | 75 | 210 | — | — | Compar. |
| 1.05 | 115 | 310 | — | — | Compar. |
| 1.06 | 75 | 270 | — | — | Compar. |
| 1.07 | 105 | 250 | — | — | Compar. |
| 1.08 | 130 | 340 | 110 | 100 | Compar. |
| 1.09 | 145 | 465 | 150 | 140 | acc. to invent. |
| 1.10 | 165 | 460 | 160 | 165 | acc. to invent. |

Figure 1:
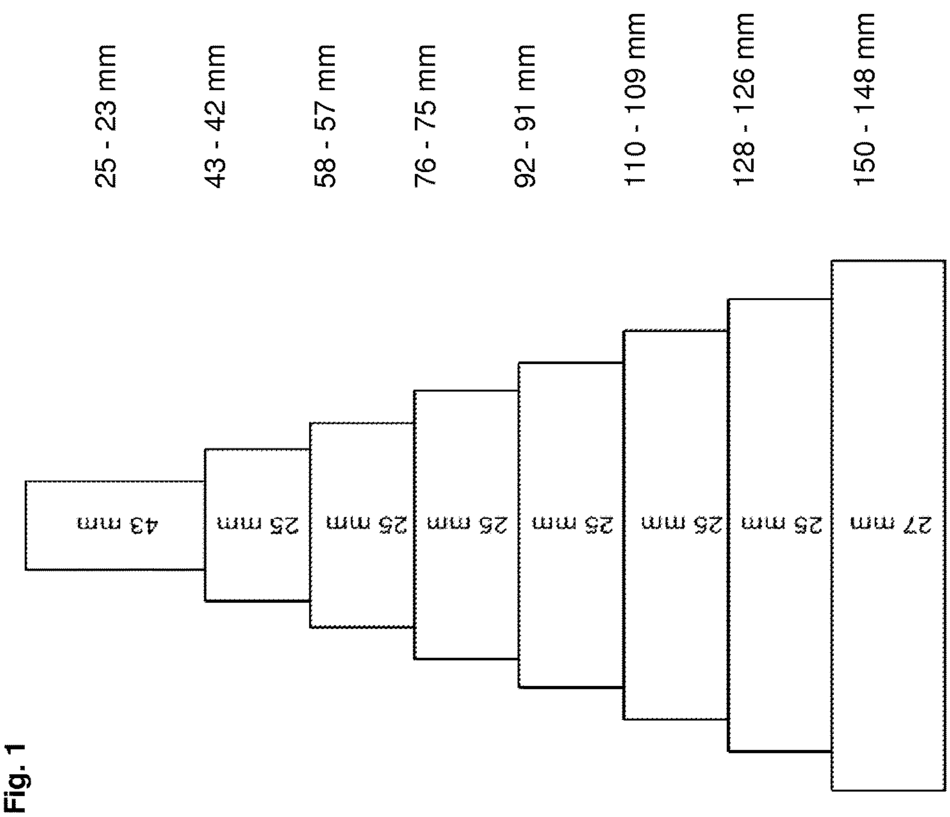
FIG. 1 shows a side elevation view of a step core used to test the mold material mixture of the inventive concept.

PT = processing time;
— = nicht bestimmt;
Compar. = not according to the invention;
acc. to invent. = according to the invention Improvement of the Casting Surface The effects of particulate mixed metal oxides according to the invention on the casting surface were investigated. The following procedure was used:

So-called step cores were produced. Their shapes and dimensions are shown in FIGS. 1 and 2. FIG. 1 shows a side view, specifying the step heights in mm inside the figure and the external diameter of the steps to the right of this (first value diameter of step below, second value diameter of step above).

In FIG. 2 the step core is shown from the top. The production was performed using a Hot-Box core shooting machine, the molding tool of which was heated to 180° C. The mold material mixture was introduced into the molding tool under pressure, and to accelerate hot curing, hot air was passed through the mold material mixture). The using the mold material mixtures 1.02 as well as 1.09 and 1.10 in Table 1 were incorporated into a sand casting mold in such a manner that only the underside of the widest step (the standing surface of the pyramidal core) does not come into contact with the casting metal during the casting process. The step cores hang in the casting mold, which is then filled with the liquid metal in such a manner that the smallest step (narrowest width) is the first to make contact with the liquid metal.

Casting was performed with a gray cast iron melt GG20 (new name: GJL20) at a casting temperature of about 1430° C. and a casting height of 55 cm.

After cooling the casting mold, the casting was freed from sand by striking with a hammer.

The castings were then evaluated in terms of the remaining sand adhesions, the possible sintering/burning-in, and the roughness. Ratings from 1 (very good) to 6 (inadequate) were awarded; these are shown in Table 3. The castings obtained are not yet free from sand adhesions; especially in areas with delicate core parts (steps with low widths), sand adhesions can be observed, and therefore the following procedure was employed.

Then the castings were cleaned with a sand-blasting device with a light sand-blasting pressure of 1 bar. The grit used was glass beads with particle diameters of between 100 and 200 µm.

The sand-blasting time was limited to one minute. The conditions for cleaning by sand-blasting were selected such that differences between the castings produced with different mold material mixtures could be visualized without substantially affecting the surface quality.

The castings were then evaluated with regard to the possible sintering/burning-in and the surface roughness. For this purpose grades from 1 (to) to 6 (inadequate) were awarded; these are shown in Table 3.

TABLE 3

| Evaluation of the surface quality | | | |
|---|---|---|---|
| | Surface quality before sand-blasting | Surface quality after sand-blasting | |
| 1.02 | 5 | 4 | Compar. |
| 1.09 | 3 | 2 | acc. to invent. |
| 1.10 | 2 | 1 | acc. to invent. |

The casting section of mixture 1.02 demonstrates clearly more sand adhesion/burning-in or roughness than the casting sections of mixtures 1.09 and 1.10. The positive effect of the powder according to the invention on the casting surfaces is very clear here. Particularly advantageous results are obtained with the dust-type byproduct from zirconium corundum production. Therefore the use of this substance is very particularly preferred.

The surface quality is distinctly improved by the use of sand-blasting, since adhering sand residues can be removed completely—the surface is also smoothed somewhat by this use. However, great attention was paid to blasting all castings under the same conditions. Therefore the differences are merely attributable to the compositions of the mold material mixtures.

It should also be noted that so-called "veining" can only be observed to a very small extent or not at all, although quartz sand was used as the mold base material.

The invention claimed is:

1. A mold material mixture for producing casting molds and cores for metal processing, comprising:

a) a refractory mold base material;

b) water glass as an inorganic binder; and c) a powdered additive of at least one mixed particulate metal oxide, containing at least one oxide of aluminum and at least one oxide of zirconium, wherein the mixed particulate metal oxide is:

at least one particulate mixed oxide;

a particulate mixture of at least two oxides; or at least one particulate mixed oxide, with either at least one further particulate oxide or at least one further different particulate mixed oxide;

wherein the mixed particulate metal oxide is present at between 0.05 wt % and 2.0 wt %, based on the weight of the refractory mold base material.

2. The mold material mixture according to claim 1, wherein the powdered additive further comprises an oxide of silicon other than a particulate amorphous silicon dioxide.

3. The mold material mixture according to claim 1, wherein the powdered additive consists of an oxide of silicon, other than particulate amorphous silicon dioxide, an oxide of aluminum and an oxide of zirconium.

4. The mold material mixture according to claim 1, wherein at least one of the following applies, independent of one another:

the oxide of silicon is a silicon dioxide;

the oxide of aluminum is an aluminum oxide in the form of $\alpha$-$Al_2O_3$;

the oxide of zirconium is a zirconium dioxide;

the oxide of silicon and the oxide of aluminum is an aluminum silicate.

5. The mold material mixture according to claim 2, wherein, the oxide of silicon and the oxide of aluminum is an aluminum silicate and, based on the sum of aluminum and silicon atoms, contains more than 50 to 99 atom % aluminum atoms.

6. The mold material mixture according to claim 4, wherein the aluminum silicate comprises a nesosilicate.

7. The mold material mixture according to claim 1, wherein the powdered additive comprises at least one of: a zirconium corundum and a zirconium mullite.

8. The mold material mixture according to claim 1, wherein, in the powdered additive:

a) the fraction of the oxide of aluminum, calculated as $Al_2O_3$, is greater than 25 wt. %;

b) the fraction of the oxide of zirconium, calculated as $ZrO_2$, is greater than 2 wt. %;

c) if present, the fraction of the oxide of silicon, calculated as $SiO_2$, is greater than 5 wt. %; and d) the fraction of other metals is less than 12 wt. %, calculated as their oxides in the principal oxidation states, namely, $Fe_2O_3$, $Na_2O$, $TiO_2$, MgO and CaO.

9. The mold material mixture according to claim 1, wherein the powdered additive is a dust containing aluminum oxide and zirconium oxide obtained as a byproduct in zirconium corundum production.

10. The mold material mixture according to claim 1, wherein the mixed oxide has a specific surface that is less than 50 $m^2/g$.

11. The mold material mixture according to claim 1, wherein the powdered additive has a mean primary particle size determined as the diameter thereof between 0.01 μm and 50 μm.

12. The mold material mixture according to claim 1, wherein a maximum of 50 wt % of the powdered additive is retained on a screen with 75 μm mesh size (200 mesh).

13. The mold material mixture according to claim 1, wherein the powdered additive has a mean ratio of the greatest longitudinal dimension to the smallest longitudinal dimension for all spatial directions of the respective particles thereof is less than 10:1.

14. The mold material mixture according to claim 9, wherein the powdered additive is a bulk, free-flowing powder.

15. The mold material mixture according to claim 1, wherein the mold material mixture contains a maximum of 1 wt. % organic compounds, based on the weight of the refractory mold base material.

16. The mold material mixture according to claim 1, further comprising barium sulfate, in a quantity of 0.02 to 5.0 wt. %, based on the total mold material mixture.

17. The mold material mixture according to claim 1, wherein the water glass has a $SiO_2/M_2O$ molar fraction of 1.6 to 4.0, with M equal to the sum of lithium, sodium and potassium.

18. The mold material mixture according to claim 1, wherein the water glass is present at 0.5 to 5 wt. %, preferably 1 to 3.5 wt. %, based on the weight of the refractory mold base material, wherein the solid fraction of the water glass amounts to 25 to 65 wt. %.

19. The mold material mixture according to claim 1, further comprising surfactants in a fraction of 0.001 to 1 wt. %, based on the weight of the refractory mold base material.

20. The mold material mixture according to claim 1, further comprising graphite, from 0.05 to 1 wt. %, based on the weight of the refractory mold base material.

21. The mold material mixture according to claim 1, further comprising at least one phosphorus-containing compound, at between 0.05 and 1.0 wt. %, based on the weight of the refractory mold base material.

22. The mold material mixture according to claim 6, wherein the nesosilicate is selected from the group consisting of synthetic mullite, natural mullite, sillimanite, kyanite, and andalusite.

23. The mold material mixture according to claim 6, wherein the aluminum silicate is not and does not contain a layered silicate.

24. The mold material mixture according to claim 4, wherein:

the aluminum silicate is an amorphous aluminum silicate.

25. The mold material mixture according to claim 15, wherein the mold material mixture contains a maximum of 0.2 wt. %, organic compounds, based on the weight of the refractory mold base material.

* * * * *